(12) United States Patent  (10) Patent No.: US 7,757,263 B2
Tatsuta et al.  (45) Date of Patent: Jul. 13, 2010

(54) FRONT-END DEVICE OF SET-TOP BOX FOR TWO-WAY COMMUNICATION

(75) Inventors: Akihiro Tatsuta, Kyoto (JP); Yutaka Yamada, Osaka (JP); Tomonori Shiomi, Osaka (JP)

(73) Assignee: Panasonic Corporation, Osaka (JP)

( * ) Notice: Subject to any disclaimer, the term of this patent is extended or adjusted under 35 U.S.C. 154(b) by 880 days.

(21) Appl. No.: 11/374,743

(22) Filed: Mar. 14, 2006

(65) Prior Publication Data
US 2008/0007898 A1 Jan. 10, 2008

(30) Foreign Application Priority Data
Mar. 25, 2005 (JP) .............................. 2005-089570

(51) Int. Cl.
H04N 7/16 (2006.01)
(52) U.S. Cl. .................. 725/132; 725/100; 725/140
(58) Field of Classification Search .................. 725/68, 725/85, 100, 131, 139, 132, 140
See application file for complete search history.

(56) References Cited

U.S. PATENT DOCUMENTS 6,081,533 A * 6/2000 Laubach et al. ............. 370/421
6,550,063 B1 * 4/2003 Matsuura ..................... 725/133
6,757,909 B1 * 6/2004 Maruo et al. ................. 725/111
2001/0037512 A1 11/2001 Flickner et al.
2003/0133049 A1 * 7/2003 Cowley et al. .............. 348/731
2004/0016001 A1 * 1/2004 Kawano et al. ............. 725/151
2005/0032495 A1 2/2005 Stalf et al.
2005/0105007 A1 * 5/2005 Christian ..................... 348/731
2006/0026661 A1 * 2/2006 McMullin et al. ........... 725/127
2006/0182279 A1 * 8/2006 Maruo et al. ................. 380/210

FOREIGN PATENT DOCUMENTS

| CN | 1316831 A | 10/2001 |
| JP | 2004-343239 A | 12/2004 |
| JP | 2004343239 A * | 12/2004 |

* cited by examiner

Primary Examiner—Andrew Y Koenig
Assistant Examiner—Ricky Chin
(74) Attorney, Agent, or Firm—RatnerPrestia

(57) ABSTRACT

The device includes a cable interface module having a diplexer that outputs a first signal input from a first connector part connected to a cable television network to a third connector part and outputs a second signal input from a second connector part to a first connector part; a video tuner module having a distributor that branches a first signal input from a fourth connector part having a shape capable of connecting to the cable television network and connected to a third connector part and outputs to a fifth connector part, and inputs the other branched signal into a video tuner; and a communication tuner that selects another channel of the signal output from a fifth connector part.

17 Claims, 6 Drawing Sheets

FRONT-END DEVICE OF SET-TOP BOX FOR TWO-WAY COMMUNICATION

BACKGROUND OF THE INVENTION

1. Field of the Invention

The present invention relates to a set-top box that is installed in the home of a subscriber to a cable television network, and more particularly to a front-end device of a set-top box for two-way communication with a built-in cable modem for performing data communication on a cable television network.

2. Related Art of the Invention

A set-top box for two-way communication which has a built-in cable modem for conducting data communication has been proposed for cable television networks in order to enable services such as video distribution services from the head-end to a subscriber's home, internet services that perform data communication between the head-end and a subscriber's home and, more recently, video-on-demand services that combine video distribution and data communication (for example, see Japanese Patent Laid-Open No. 2004-343239).

FIG. 5 is a view showing the external appearance of a conventional front-end device of a set-top box for two-way communication with a built-in cable modem. FIG. 6 is a view showing the configuration of a cable interface module 41 of the conventional front-end device of a set-top box for two-way communication.

Hereunder, one example of the above conventional front-end device of a set-top box for two-way communication will be described referring to the drawings.

As shown in FIG. 5, a cable interface module 41, a video tuner 42 and a communication tuner 43 are disposed on a main substrate 46.

The cable interface module 41 is provided with a first connector terminal 45a, a second connector terminal 45b, a third connector terminal 45c and a fourth connector terminal 45d. The fourth connector terminal 45d is connected to the video tuner 42 by a first coaxial cable 44a, and the third connector terminal 45c is connected to the communication tuner 43 by a second coaxial cable 44b. The first connector terminal 45a and the second connector terminal 45b are external terminals of the set-top box for two-way communication.

Further, as shown in FIG. 6, the cable interface module 41 comprises a diplexer 51, a first distributor 52, a second distributor 53, a filter 54 and an amplifier 55. The first connector terminal 45a is connected to the diplexer 51, the second connector terminal 45b and the fourth connector terminal 45d are connected to the second distributor 53, and the third connector terminal 45c is connected to the diplexer 51 and the filter 54.

The operation of the conventional front-end device of the set-top box for two-way communication that is configured as described above is described below.

First, in the cable interface module 41, the first connector terminal 45a is connected to the cable television network and the second connector terminal 45b is connected to an audio-visual device in the subscriber's home. Signals of the cable television network that are input to and output from the first connector terminal 45a are subjected to frequency separation by the diplexer 51 such that downstream signals (90 MHz or more) from the head-end to the subscriber's home are separated and sent to the amplifier 55 and upstream signals (55 MHz or less) from the subscriber's home to the head-end are separated and sent to the third connector terminal 45c.

The amplifier 55 amplifies the downstream signal and inputs the signal to the first distributor 52. The first distributor 52 distributes the power of the downstream signal to output signals to the filter 54 and the second distributor 53. The second distributor 53 distributes the power of the downstream signal again to output signals to the second connector terminal 45b and the fourth connector terminal 45d. Since a downstream signal is output to the second connector terminal 45b, another audio-visual device can be connected thereto for use.

The filter 54 allows only a downstream signal (90 MHz or more) to pass through and outputs the signal to the third connector terminal 45c. Because of the operation of the filter 54, upstream signals of the cable television network only pass between the first connector terminal 45a and the third connector terminal 45c.

The above is a description of the operation of the cable interface module 41.

Next, the operation of the video tuner 42 and the communication tuner 43 will be described.

The video tuner 42 selects (i.e., tunes to) one channel of the downstream signal and outputs the data to a video signal demodulating part. Meanwhile, the communication tuner 43 selects another single channel of the downstream signal to output the data to a communication signal demodulating part and also mixes the data with data that is input from a communication signal modulating part to supply the resulting data to the third connector terminal 45c of the cable interface module 41.

A front-end device of a set-top box for two-way communication can be configured in this manner. Thus, the front-end device of a set-top box for two-way communication is commonly configured by connecting video tuner 42 and communication tuner 43 that are commercially available with the custom-built cable interface module 41 using coaxial cables.

However, in order to change the front-end device of a set-top box for two-way communication with the conventional configuration into a front-end device of a set-top box without a built-in cable modem, the cable interface module had to be newly designed.

There is no necessity for a set-top box that is dedicated to a video distribution service to include a cable modem for carrying out data communication.

For example, when diverting the front-end device for a set-top box for two-way communication that includes a cable modem, as shown in FIG. 5, for use as the front-end device of a set-top box dedicated to a video distribution service, if only the communication tuner 43 is removed some parts will remain that are not required in a set-top box dedicated to a video distribution service. More specifically, the diplexer 51, first distributor 52, filter 54 and the like of the cable interface module 41 shown in FIG. 6 are parts that are not necessary in a set-top box that is dedicated to a video distribution service. Since costs are increased by these remaining parts, conventionally the cable interface module has been newly designed to create the front-end device of a set-top box dedicated to a video distribution service.

Further, in the conventional front-end device of a set-top box for two-way communication, since the cable interface module 41, video tuner 42 and communication tuner 43 are disposed on the main substrate 46 and connected to each other using the first coaxial cable 44a and second coaxial cable 44b, a drawback existed with respect to an increase in material costs and a rise in the number of assembly man-hours.

Further, the filter 54 is necessary because the second coaxial cable 44b is used for the connection between the cable interface module 41 and the communication tuner 43 in which downstream signals were superimposed with upstream signals.

It is an object of the present invention to solve the above-described drawbacks of the prior art by providing a front-end device of a set-top box for two-way communication that enables a reduction in the number of parts and easily realizes common use for a set-top box without a built-in cable modem.

SUMMARY OF THE INVENTION

In order to solve the above problems, the $1^{st}$ aspect of the present invention is a front-end device of a set-top box for two-way communication, the front-end device comprising:

a cable interface module having a first connector part for connection to a cable television network, a second connector part, a third connector part and a diplexer that is connected to the first connector part, the second connector part and the third connector part, the diplexer being operable to receive a first signal that is input from the first connector part and output the first signal to the third connector part, and output, to the first connector part, a second signal that is input from the second connector part and that is of a frequency lower than the first signal;

a video tuner module having a fourth connector part that has a shape that can connect to the cable television network and is connected to the third connector part, a fifth connector part, a video tuner that selects a channel from an input signal, and a first distributor that is connected to the fourth connector part, the fifth connector part and the video tuner, and which branches the first signal that is input from the fourth connector part to output from the fifth connector part and input another branched signal into the video tuner; and a communication tuner that is connected to the fifth connector part and selects another channel from the signal output from the fifth connector part.

The $2^{nd}$ aspect of the present invention is the front-end device of a set-top box for two-way communication according to the $1^{st}$ aspect of the present invention, wherein:

the cable interface module has a second distributor that is provided between the diplexer and the third connector part and which branches the first signal to output from the third connector part, and has a sixth connector part that is connected to an audio-visual device for a subscriber and outputs another signal that is branched by the second distributor; and the video tuner module has a seventh connector part that is connected to the first distributor and has a shape that can connect to the audio-visual device for the subscriber.

The $3^{rd}$ aspect of the present invention is the front-end device of a set-top box for two-way communication according to the $2^{nd}$ aspect of the present invention, having an amplifier disposed either between the second distributor and the third connector part or between the fourth connector part and the first distributor.

The $4^{th}$ aspect of the present invention is the front-end device of a set-top box for two-way communication according to the $1^{st}$ aspect of the present invention, wherein the cable interface module, the video tuner module and the communication tuner are disposed on a main substrate and the communication tuner is connected to the fifth connector part through a wiring pattern inside the main substrate.

The $5^{th}$ aspect of the present invention is the front-end device of a set-top box for two-way communication according to the $4^{th}$ aspect of the present invention, wherein a circuit of the communication tuner is configured inside the main substrate.

The $6^{th}$ aspect of the present invention is the front-end device of a set-top box for two-way communication according to the $1^{st}$ aspect of the present invention, wherein the communication tuner includes:

a first variable amplifier that amplifies a signal that is output from the fifth connector part;

a frequency converter that selects the other channel from the signal amplified by the first variable amplifier;

a second variable amplifier that amplifies the other channel of the signal that is selected by the frequency converter;

a first filter that smoothes a signal for controlling a gain of the first variable amplifier and inputs the signal into the first variable amplifier; and a second filter that smoothes a signal for controlling a gain of the second variable amplifier and inputs the signal into the second variable amplifier; and wherein a time constant of the first filter is greater than or equal to a time constant of the second filter.

The $7^{th}$ aspect of the present invention is the front-end device of a set-top box for two-way communication according to the $4^{th}$ aspect of the present invention, wherein a circuit of the communication tuner is configured on a substrate that is other than the main substrate.

The $8^{th}$ aspect of the present invention is the front-end device of a set-top box for two-way communication according to the $2^{nd}$ aspect of the present invention, wherein the first connector part and the sixth connector part are external terminals of the set-top box.

The $9^{th}$ aspect of the present invention is the front-end device of a set-top box for two-way communication according to the $1^{st}$ aspect of the present invention, wherein one of the third connector part and the fourth connector part is a male connector and the other one of the third connector part and the fourth connector part is a female connector, the male and female connectors being directly connected without the use of an indirect connection that uses a cable.

The $10^{th}$ aspect of the present invention is a front-end device of a set top box, the front-end device being configurable with and without each of a cable interface module and a communication tuner, the front-end device comprising:

a cable interface module including a first connector part, a second connector part, a third connector part, a sixth connector part and a diplexer connected to the first connector part, the second connector part and the third connector part, the diplexer being operable to receive a first signal that is input from the first connector part and output the first signal to the third connector part, and output, to the first connector part, a second signal that is input from the second connector part and that has a frequency lower than the first signal;

a video tuner module including a video tuner operable to select a channel from an input signal, a fourth connector part, a fifth connector part, a seventh connector part, and a first distributor that is connected to the fourth connector part, the fifth connector part, the seventh connector part and the video tuner, and operable to branch the first signal that is input from the fourth connector part to output from each of the fifth connector part and seventh connector part, and input another branched signal into the video tuner; and a communication tuner operable to select another channel from an inputted signal;

wherein for configuration of the front-end device with each of the cable interface module and the communication tuner, the first connector part, the sixth connector part and the third connector part of the cable interface module are connected to a cable television network, an audio-visual device for a subscriber and the fourth connector part, respectively, and the fifth connector part is connected to the communication tuner to provide the inputted signal; and wherein for configuration of the front-end device without each of the cable interface module and communication tuner, the fourth connector part and the seventh connector part of the video tuner module are connected to the cable television network and the audio-visual device for the subscriber, respectively.

The 11th aspect of the present invention is a front-end device of a set-top box according to the 10th aspect of the present invention, wherein the first connector part and the fourth connector part have the same shape for connection to the cable television network, and the sixth connection part and seventh connection part have the same shape for connection to the audio-visual device of the subscriber.

The 12th aspect of the present invention is the front-end device of a set-top box according to the 10th aspect of the present invention, wherein for configuration of the front-end device with each of the cable interface module and communication tuner, one of the third connector part and the fourth connector part is a male connector and the other one of the third connector part and the fourth connector part is a female connector, the male and female connectors being directly connected without the use of an indirect connection that uses a cable.

The 13th aspect of the present invention is the front-end device of a set-top box according to the 10th aspect of the present invention, wherein the front-end device is configured with each of the cable interface module and the communication tuner when the set-top box includes a cable modem and is configured without each of the cable interface module and the communication tuner when the set-top box does not include a cable modem.

The 14th aspect of the present invention is a front-end device of a set top box, the front-end device being configurable with and without each of a cable interface module and a communication tuner, the front-end device comprising:

a cable interface module operable to provide an interface between a cable television network and a video tuner module, the cable interface module including a first connector part, a second connector part, a third connector part, and a sixth connector part;

the video tuner module including a video tuner operable to select a channel from an input signal, a fourth connector part, a fifth connector part, and a seventh connector part; and a communication tuner operable to select another channel from an inputted signal;

wherein for configuration of the front-end device with each of the cable interface module and communication tuner, the first connector part, sixth connector part and third connector part of the cable interface module are connected to a cable television network, an audio-visual device for a subscriber and the fourth connector part, respectively, and the fifth connector part is connected to the communication tuner to provide the inputted signal; and wherein for configuration of the front-end device without each of the cable interface module and communication tuner, the fourth connector part and seventh connector part of the video tuner module are connected to the cable television network and the audio-visual device for the subscriber, respectively.

The 15th aspect of the present invention is a front-end device of a set-top box according to the 14th aspect of the present invention, wherein the first connector part and the fourth connector part have the same shape for connection to the cable television network, and the sixth connection part and seventh connection part have the same shape for connection to the audio-visual device of the subscriber.

The 16th aspect of the present invention is the front-end device of a set-top box according to the 14th aspect of the present invention, wherein for configuration of the front-end device with each of the cable interface module and communication tuner, one of the third connector part and the fourth connector part is a male connector and the other one of the third connector part and the fourth connector part is a female connector, the male and female connectors being directly connected without the use of an indirect connection that uses a cable.

The 17th aspect of the present invention is a method of configuring a front-end device of a set-top box for two-way communication without a built-in cable modem, from a front-end device of a set-top box for two-way communication, which has a cable interface module in which a diplexer and a distributor are inserted into one unit and a video tuner module in which an amplifier, a distributor and a video tuner are inserted into one unit, with the cable interface module and the video tuner module being disposed on a main substrate, and has a circuit of a communication tuner configured on the main substrate, by removing the cable interface module and the communication tuner and by connecting the video tuner module to a cable television network and an audio-visual device in a subscriber's home.

According to this invention, there can be provided a front-end device of a set-top box for two-way communication that enables a reduction in the number of parts and easily realizes common use for a set-top box without a built-in cable modem.

DESCRIPTION OF SYMBOLS

Figure 1:
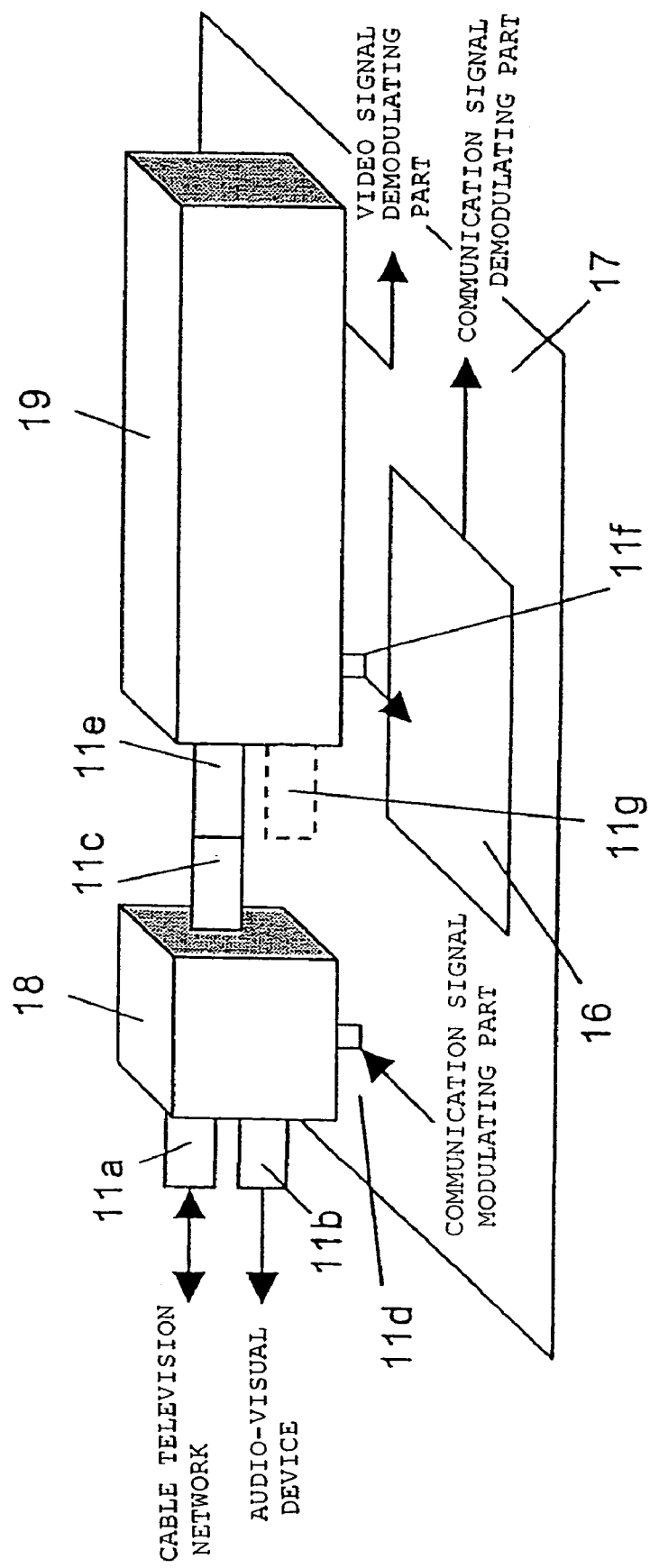
FIG. 1 is an external view of the front-end device of a set-top box for two-way communication of Embodiment 1 of this invention.

11a first connector terminal
11b sixth connector terminal
11c third connector terminal
11d second connector terminal
11e fourth connector terminal
11f fifth connector terminal
11g seventh connector terminal
12 diplexer
13 second distributor
14 first distributor
15 video tuner
16 communication tuner
17 main substrate
18 cable interface module
19 video tuner module
20 communication tuner
21 communication tuner connector terminal
22 amplifier
31 first variable amplifier 32 frequency converter
33 second variable amplifier
34 first filter
35 second filter
41 cable interface module
42 video tuner
43 communication tuner
44a first coaxial cable
44b second coaxial cable
45a first connector terminal
45b second connector terminal
45c third connector terminal
45d fourth connector terminal
46 main substrate
51 diplexer
52 first distributor
53 second distributor
54 filter
55 amplifier

PREFERRED EMBODIMENTS OF THE INVENTION

Hereunder, preferred embodiments of this invention are described referring to the drawings.

Embodiment 1

Figure 2:
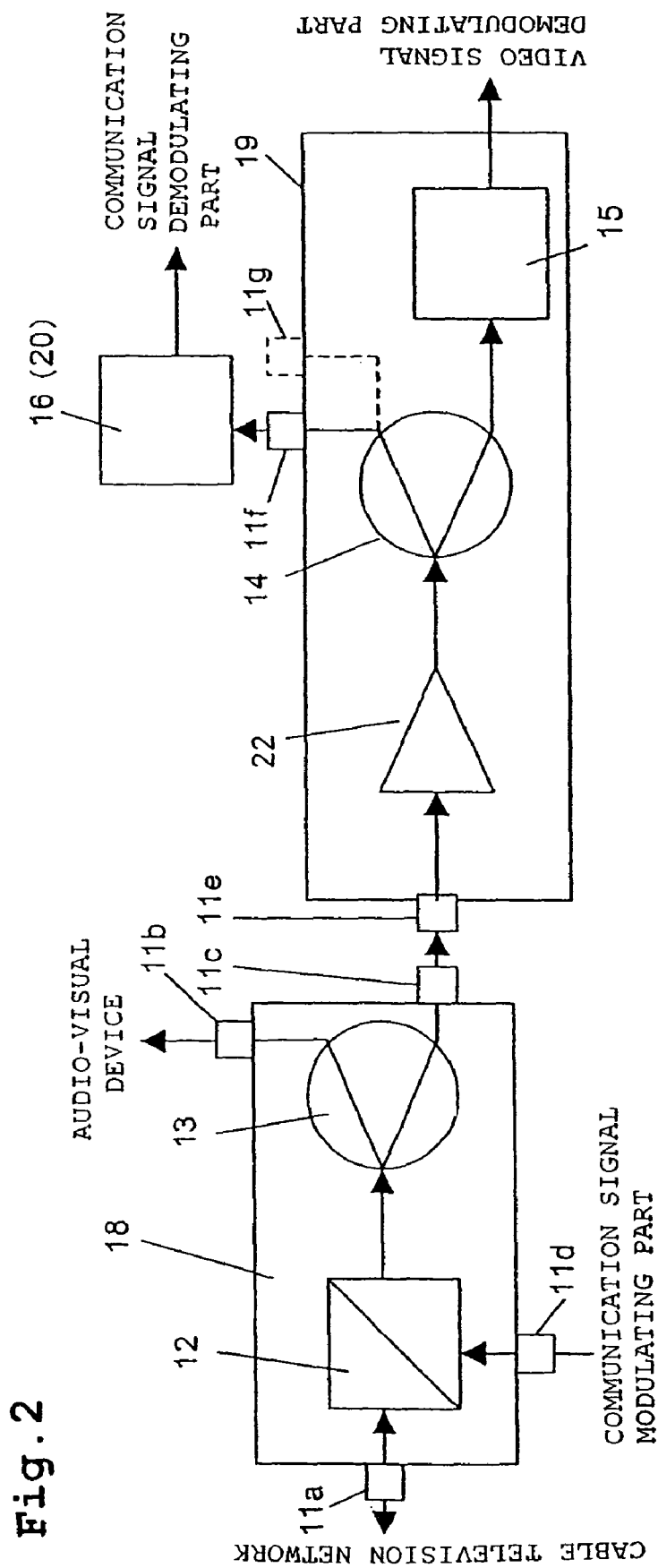
FIG. 2 is a configuration diagram of the front-end device of a set-top box for two-way communication of Embodiments 1 and 2 of this invention.

FIG. 1 is a view showing the external appearance of a front-end device of a set-top box for two-way communication of Embodiment 1 of this invention. FIG. 2 is a view showing the configuration of the front-end device of a set-top box for two-way communication of Embodiment 1.

As shown in FIG. 1, a cable interface module 18 and a video tuner module 19 are disposed on a main substrate 17. Further, a circuit of a communication tuner 16 is configured on the main substrate 17.

As shown in FIG. 1 and FIG. 2, a first connector terminal 11a, a second connector terminal 11d, a third connector terminal 11c and a sixth connector terminal 11b are provided on the cable interface module 18. Further, a fourth connector terminal 11e and a fifth connector terminal 11f are provided on the video tuner module 19.

The cable interface module 18 and the video tuner module 19 are connected by connecting the third connector terminal 11c and the fourth connector terminal 11e. Further, for the video tuner module 19, the fifth connector terminal 11f is connected to a wiring pattern on the main substrate 17 and is connected to the communication tuner 16 through the wiring pattern on the main substrate 17.

In this connection, the first connector terminal 11a, second connector terminal 11d, third connector terminal 11c, fourth connector terminal 11e, fifth connector terminal 11f and sixth connector terminal 11b respectively correspond to examples of the first to sixth connector parts of this invention.

Further, the first connector terminal 11a is connected to a cable television network and the sixth connector terminal 11b is connected to an audio-visual device in the subscriber's home. These two terminals are external terminals of the set-top box for two-way communication of Embodiment 1.

As shown in FIG. 2, the cable interface module 18 comprises a diplexer 12 and a second distributor 13. The first connector terminal 11a and the second connector terminal 11d are connected to the diplexer 12, and the third connector terminal 11c and the sixth connector terminal 11b are connected to the second distributor 13.

The video tuner module 19 comprises an amplifier 22, a first distributor 14 and a video tuner 15. The fourth connector terminal 11e is connected to the amplifier 22, and the fifth connector terminal 11f is connected to the first distributor 14.

The operation of the front-end device of a set-top box for two-way communication of Embodiment 1 that is configured as described in the foregoing will now be explained referring to FIG. 1 and FIG. 2.

First, the operation of the cable interface module 18 will be explained.

The first connector terminal 11a is connected to a cable television network and the sixth connector terminal 11b is connected to an audio-visual device in the subscriber's home. The diplexer 12 that is connected to the first connector terminal 11a subjects the upstream signals (frequency of 55 MHz or less) and downstream signals (frequency of 70 MHz or more) of the cable television network to frequency separation, and outputs the downstream signals to the second distributor 13. The second distributor 13 distributes the power of the thus-input signal and outputs the distributed signals to the third connector terminal 11c and sixth connector terminal 11b, respectively. Since a downstream signal is output without change to the sixth connector terminal 11b it is possible to connect an audio-visual device thereto for use.

In this connection, a downstream signal from the cable television network corresponds to an example of a first signal of this invention, and an upstream signal to the cable television network corresponds to an example of a second signal of this invention.

Further, data from a communication signal modulating part is input as an upstream signal to the diplexer 12 from the second connector terminal 11d. More specifically, data from the communication signal modulating part is input into the cable interface module 18 without passing through the communication tuner 16. Accordingly, upstream signals of the cable television network pass between the second connector terminal 11d and the first connector terminal 11a.

As described in the foregoing, the cable interface module 18 is composed of a single unit that includes the diplexer 12 and the second distributor 13 as built-in components.

Next, the operation of the video tuner module 19 is explained.

The fourth connector terminal 11e is connected directly with the third connector terminal 11c of the cable interface module 18. The third connector terminal 11c and fourth connector terminal 11e are a male connector and a female connector that are directly connected without an indirect connection that uses a coaxial cable. In this case, the fourth connector terminal 11e is a connector terminal that has the same shape as the first connector terminal 11a.

The amplifier 22 amplifies a downstream signal that is input from the fourth connector terminal 11e and outputs the amplified signal to the first distributor 14. The first distributor 14 distributes the power of the downstream signal and outputs the distributed signals to the video tuner 15 and the fifth connector terminal 11f, respectively.

The video tuner 15 selects one channel of the downstream signal and outputs the data to a video signal demodulating part. Further, the fifth connector terminal 11f connects to the wiring pattern of the main substrate 17 to output a downstream signal.

As described in the foregoing, the video tuner module 19 is composed of a single unit that includes the amplifier 22, the first distributor 14 and the video tuner 15 as built-in components.

Next, the operation of the communication tuner 16 will be described.

The circuit of the communication tuner 16 is configured on the main substrate 17. The downstream signal output from the fifth connector terminal 11f of the video tuner module 19 is input into the communication tuner 16 through the wiring pattern on the main substrate 17.

The communication tuner 16 selects another one channel of the downstream signal and outputs the data to the communication signal demodulating part.

The above is an explanation of the operation of Embodiment 1 that includes a built-in cable modem as a front-end device of a set-top box for two-way communication.

Next, a method will be described of configuring a front-end device of a set-top box that does not include a built-in cable modem from the front-end device of a set-top box for two-way communication of Embodiment 1.

First, the cable interface module 18 that is disposed on the main substrate 17 and the communication tuner 16 having a circuit configured on the main substrate 17 are respectively removed from the front-end device of Embodiment 1 having the configuration shown in FIG. 1.

Next, the fourth connector terminal 11e of the remaining video tuner module 19 is connected to the cable television network to allow input of downstream signals. In this case, because the fourth connector terminal 11e is a connector terminal that has the same shape as the first connector terminal 11a, the cable television network can be connected to the fourth connector terminal 11e without any modification.

Further, a seventh connector terminal 11g is provided to which a signal that is the same as a signal output to the fifth connector terminal 11f is output after being subjected to power distribution by the first distributor 14. The seventh connector terminal 11g has the same shape as the sixth connector terminal 11b. An audio-visual device in the subscriber's home is connected to the seventh connector terminal 11g and downstream signals are output thereto. The seventh connector terminal 11g corresponds to an example of the seventh connector part of this invention.

The fourth connector terminal 11e and the seventh connector terminal 11g are external terminals of the set-top box of Embodiment 1 that is configured without a built-in cable modem. The positional relationship between these two connector terminals is the same as the positional relationship between the first connector terminal 11a and the sixth connector terminal 11b of the cable interface module 18.

As described in the foregoing, by using the front-end device of a set-top box for two-way communication of Embodiment 1 that comprises the cable interface module 18, the video tuner module 19 and the communication tuner 16 having a circuit configured on the main substrate 17 as shown in FIG. 2, when configuring a set-top box without a built-in cable modem, a low-cost front-end device of a set-top box for two-way communication can be provided which facilitates common use as a set-top box without a built-in cable modem and does not use a coaxial cable to connect to a high frequency module by removing the cable interface module 18 and the communication tuner 16, connecting the fourth connector terminal 11e of the video tuner module 19 to the cable television network and connecting the seventh connector terminal 11g of the video tuner module 19 to an audio-visual device in the subscriber's home.

As described above, the front-end device of a set-top box for two-way communication of Embodiment 1 has a cable interface module in which a diplexer and a distributor are inserted into one unit and a video tuner module in which an amplifier, a distributor and a video tuner are inserted into one unit, with the cable interface module and the video tuner module being disposed on a main substrate, and has a circuit of a communication tuner configured on the main substrate. Thus, the present invention realizes a low-cost front-end device of a set-top box for two-way communication that facilitates common use as a set-top box with a built-in cable modem and a set-top box without a built-in cable modem and does not use coaxial cables for the connections of a high frequency module inside the set. This is achieved by, when making a set-top box without a built-in cable modem, removing the cable interface module and the communication tuner and connecting the video tuner module to the cable television network and an audio-visual device in the subscriber's home.

Embodiment 2

Next, a front-end device of a set-top box for two-way communication of Embodiment 2 of this invention will be described referring to the drawings.

Figure 3:
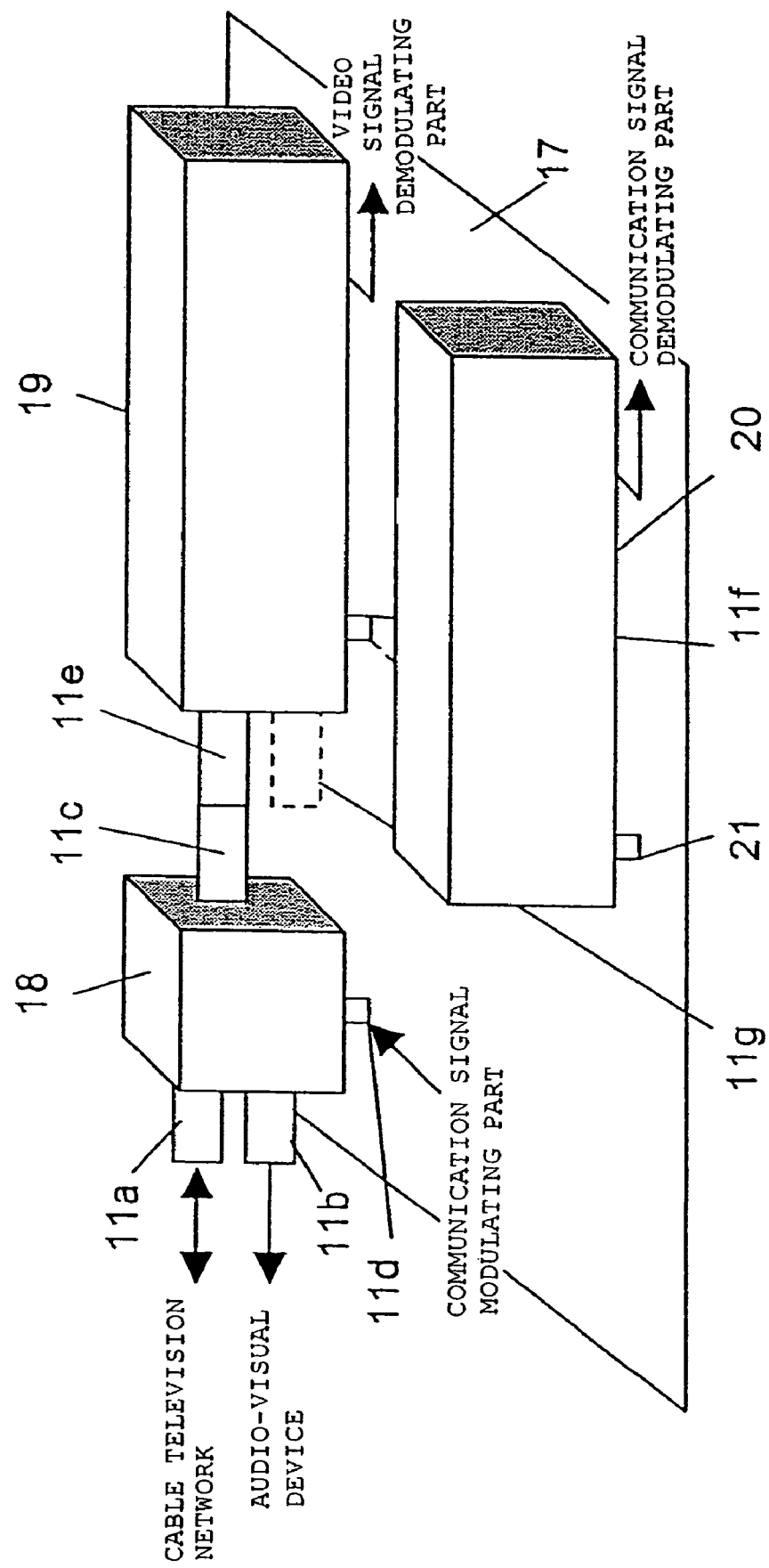
FIG. 3 is an external view of the front-end device of a set-top box for two-way communication of Embodiment 2 of this invention.

FIG. 3 is a view showing the external appearance of the front-end device of a set-top box for two-way communication of Embodiment 2. The components of this embodiment that are the same as those in the front-end device of Embodiment 1 as shown in FIG. 1 are denoted by the same symbols as in FIG. 1.

The configuration of the front-end device of the set-top box for two-way communication of Embodiment 2 is the same as that of the front-end device of Embodiment 1, except that the method of connecting the video tuner module and the communication tuner is different to that of the front-end device of Embodiment 1.

In this connection, the configuration of the front-end device of a set-top box for two-way communication of Embodiment 2 is as shown in FIG. 2, and is thus the same configuration as that of the front-end device of Embodiment 1.

Hereunder, the operation and configuration of the front-end device of a set-top box for two-way communication of Embodiment 2 will be described referring to FIG. 3.

Unlike the case of Embodiment 1, the circuit of a communication tuner 20 of the front-end device of Embodiment 2 is configured on a separate substrate to the main substrate 17, and that separate substrate is disposed on the main substrate 17. The communication tuner 20 comprises a communication tuner connector terminal 21 that is connected to a wiring pattern of the main substrate 17, and the communication tuner connector terminal 21 and the fifth connector terminal 11f of the video tuner module 19 are connected to each other through the wiring pattern of the main substrate 17.

Accordingly, a downstream signal that is output from the fifth connector terminal 11f of the video tuner module 19 is input to the connector terminal 21 of the communication tuner 20 through the wiring pattern of the main substrate 17. The communication tuner 20 selects another one channel of the downstream signal to output data to the communication signal demodulating part.

The above is a description of the operation of Embodiment 2 as a front-end device of a set-top box for two-way communication with a built-in cable modem.

Next, a method will be described of configuring a front-end device of a set-top box that does not include a cable modem from the front-end device of a set-top box for two-way communication of Embodiment 2.

First, the communication tuner 20 and the cable interface module 18 that were disposed on the main substrate 17 are removed from the front-end device of Embodiment 2 that has the configuration shown in FIG. 3.

Next, the fourth connector terminal 11e of the remaining video tuner module 19 is connected to the cable television network to allow input of downstream signals.

Then, the connector shape and mounting position of the fifth connector terminal 11f of the video tuner module 19 that is connected to the wiring pattern of the main substrate 17 are changed such that the fifth connector terminal 11f can connect to an audio-visual device in the subscriber's home as a seventh connector terminal 11g in order to output downstream signals.

The fourth connector terminal 11e and seventh connector terminal 11g are external terminals of the set-top box of Embodiment 2 that is configured without a built-in cable modem. The positional relationship between these two connector terminals is the same as the positional relationship between the first connector terminal 11a and the sixth connector terminal 11b of the cable interface module 18.

As described in the foregoing, by using the front-end device of a set-top box for two-way communication of Embodiment 2 that comprises the cable interface module 18, the video tuner module 19 and the communication tuner 20 that is configured on a substrate other than the main substrate 17, as shown in FIG. 2, when configuring a set-top box without a built-in cable modem, a low-cost front-end device of a set-top box for two-way communication can be provided which facilitates common use as a set-top box without a built-in cable modem and also does not use a coaxial cable to connect to a high frequency module by removing the cable interface module 18 and the communication tuner 20, connecting the fourth connector terminal 11e of the video tuner module 19 to the cable television network and connecting the seventh connector terminal 11g of the video tuner module 19 to an audio-visual device in the subscriber's home.

Embodiment 3

Next, a communication tuner of a front-end device of a set-top box for two-way communication of Embodiment 3 of this invention will be described referring to the drawings.

Figure 4:
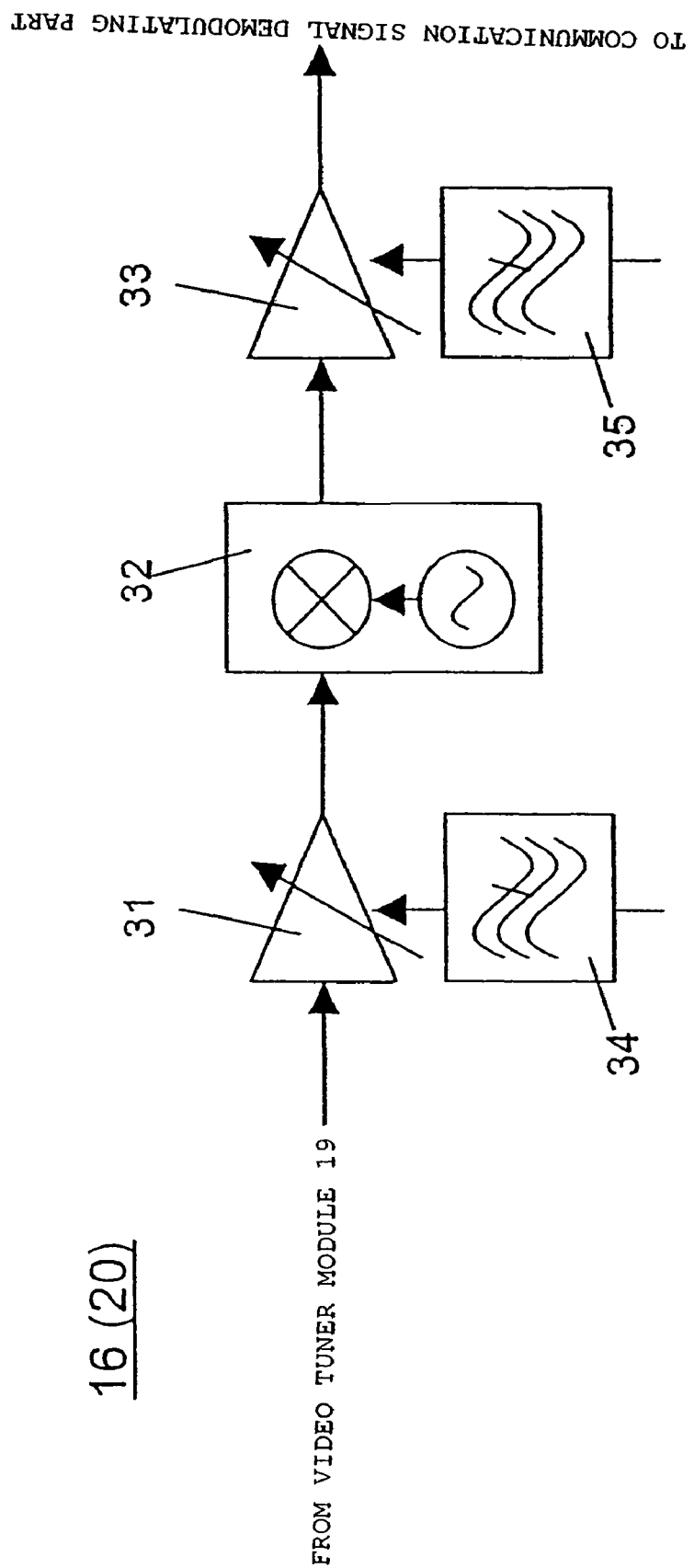
FIG. 4 is a configuration diagram of the communication tuner of Embodiment 3 of this invention.

FIG. 4 is a view showing the configuration of the communication tuner of the front-end device of the set-top box of Embodiment 3.

The external appearance and configuration of the front-end device of the set-top box for two-way communication of Embodiment 3 are the same as those of Embodiment 1 as shown in FIG. 1 and FIG. 2. The difference between this embodiment and Embodiment 1 is the configuration of the communication tuner. Since all other parts are the same as Embodiment 1, a description of the operation of Embodiment 3 as a front-end device is omitted here.

In FIG. 4, the communication tuner of Embodiment 3 comprises a first variable amplifier 31 and a first filter 34, a frequency converter 32 that is connected to the first variable amplifier 31, a second variable amplifier 33 that connects to the frequency converter 32 and a second filter 35.

Hereunder, the operation of the communication tuner of the front-end device of the set-top box for two-way communication of Embodiment 3 that is shown in FIG. 4 is described. This description is made using FIG. 1 and FIG. 4, and is based on the assumption that the communication tuner 16 of the front-end device having the configuration shown in FIG. 1 is configured as shown in FIG. 4.

First, a downstream signal that is input to the communication tuner 16 from the video tuner module 19 is amplified by the first variable amplifier 31. A downstream signal output from the variable amplifier 31 is input to the frequency converter 32 and one channel of the signal is selected. The downstream signal that is selected at the frequency converter 32 is again amplified by the second variable amplifier 33 and output as data to the communication signal demodulating part.

The gain control of the first variable amplifier 31 and the second variable amplifier 33 is input into each of these amplifiers through the first filter 34 and the second filter 35 that smooth the control signals, respectively.

Since the communication tuner 16 of Embodiment 3 as configured above is configured directly on the main substrate 17, it is likely to be influenced by noise from other circuits. In particular, when noise becomes mixed in with signals that control the gain of the first variable amplifier 31 and the second variable amplifier 33, it leads to deterioration in the reception performance. When the reception level of a downstream signal that is input into the first variable amplifier 31 is low, it is more likely to be influenced by noise than the second variable amplifier 33 since the gain of the first variable amplifier 31 is set to a high level. When the reception level of a downstream signal is low, since the signal-to-noise ratio (S/N) is also low, the deterioration in reception performance becomes noticeable.

Thus, in comparison to the conventional communication tuner which uses two filters in which the time constants are equal, in the communication tuner 16 of Embodiment 3, the time constant of the first filter 34 is made equal to or greater than the time constant of the second filter 35. By making the time constant of the first filter 34 equal to or greater than the time constant of the second filter 35, it is possible to suppress noise that gets mixed in with a signal controlling the gain of the first variable amplifier 31 to a level that is lower than noise that gets mixed in with a signal controlling the gain of the second variable amplifier 33. It is thereby possible to prevent deterioration in reception performance even when the reception level of a downstream signal is low.

As described in the foregoing, when using the communication tuner 16 of Embodiment 3, even in a case in which the circuit of the communication tuner 16 is configured on the main substrate 17 as shown in FIG. 1, the influence of the noise mixed in with the signals that control the gain of the amplifiers becomes far less and thus it is possible to prevent a deterioration in the reception performance.

In this connection, although in each of the above embodiments a downstream signal of a cable television network is taken as 70 MHz or more and an upstream signal is taken as 55 MHz, other frequencies may be employed as long as it is possible to separate the upstream signals and downstream signals.

Further, although in each of the embodiments an example is employed in which the fourth connector terminal 11e of the video tuner module 19 and a third connector terminal 11c of the cable interface module 18 are directly connected by use of a male and female connector, an adapter may be used to connect the two connectors.

Furthermore, although in each of the embodiments the video tuner module 19 outputs data to the video signal demodulating part, a configuration may be adopted in which the video signal demodulating part is included within the video tuner module 19.

In addition, although in each of the embodiments the communication tuner outputs data to the communication signal demodulating part, a configuration may be adopted in which the communication signal demodulating part is included within the communication tuner.

Further, although in each of the embodiments the communication tuner does not include a communication signal modulating part, a configuration may be adopted in which a communication signal modulating part is included within the communication tuner.

Although in the above embodiments the seventh connector terminal 11g is added to the video tuner module 19 when configuring the front-end device of a set-top box without a built-in cable modem, a configuration may be adopted in which the fifth connector terminal 11f and seventh connector terminal 11g of the video tuner module 19 are both provided at the same time with one of the terminals in an unconnected state.

Further, although in each of the embodiments the amplifier 22 is provided between the fourth connector terminal 11e and first distributor 14 of the video tuner module, a configuration may be adopted in which the amplifier 22 is provided between the third connector terminal 11c and the second distributor 13 of the cable interface module 18.

Figure 5:
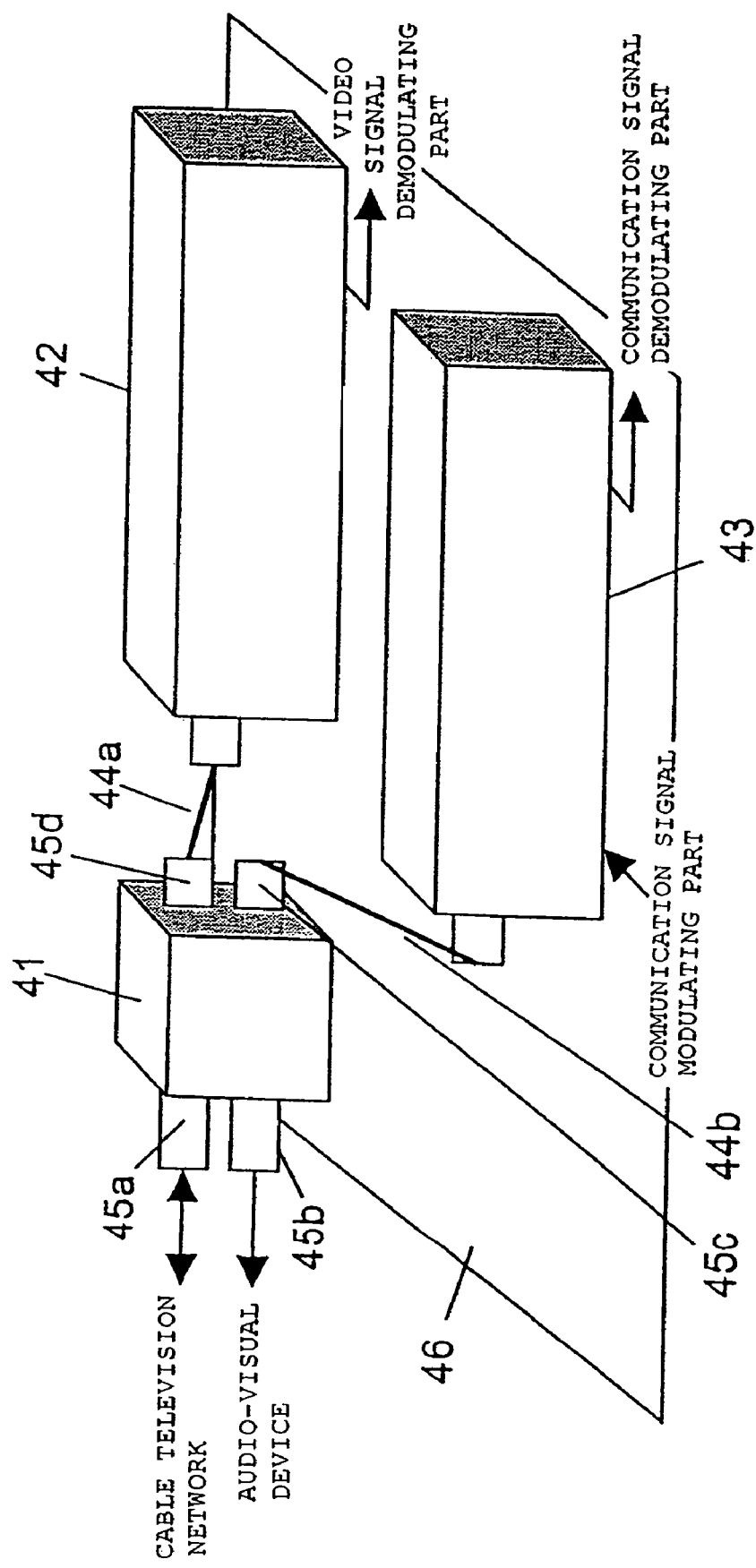
FIG. 5 is an external view of the conventional front-end device of a set-top box for two-way communication.

Although in the conventional front-end device of a set-top box for two-way communication a signal from a communication signal modulating part is input into the communication tuner 43 as shown in FIG. 5, in the front-end device of a set-top box for two-way communication of this invention, a configuration is adopted in which the signal is input directly into the cable interface module 18, as shown in FIG. 1 and FIG. 3. Therefore, although the filter 54 is required for the configuration of the conventional front-end device, the filter is not required in the front-end device of this invention.

Figure 6:
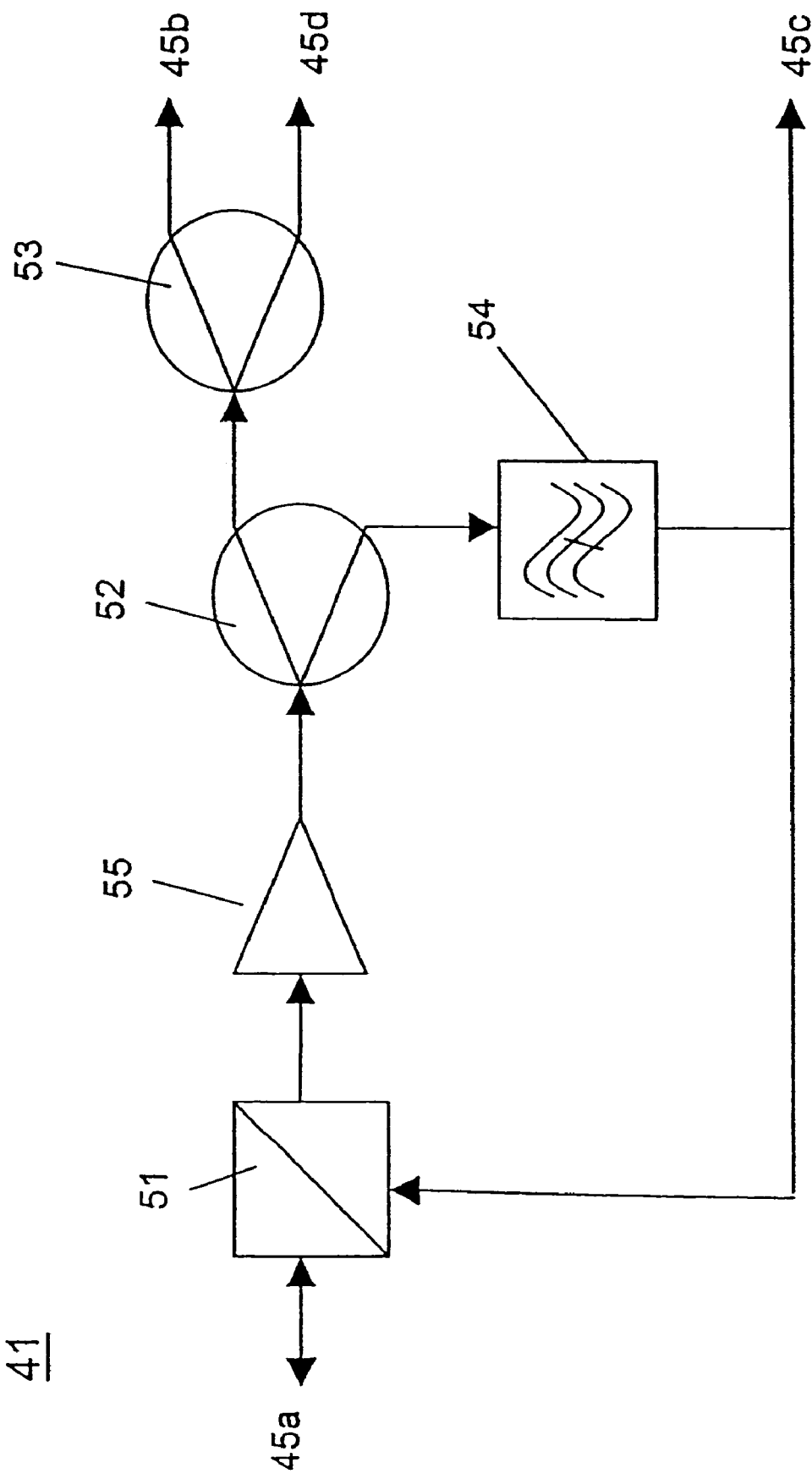
FIG. 6 is a configuration diagram of the cable interface module of the conventional front-end device of a set-top box for two-way communication.

In the case of the conventionally configured cable interface module, as shown in FIG. 6, when the cable interface module is diverted without modification for use in a front-end device of a set-top box without a built-in cable modem, parts such as the diplexer 51, the first distributor 52 and the filter 54 remain even though they are not required when the device does not include a built-in cable modem. In contrast, according to the configuration of the front-end device of this invention, when configuring a front-end device of a set-top box that does not include a built-in cable modem, the front-end device of a set-top box without a built-in cable modem can be configured at low-cost without using or retaining any unnecessary parts which are not required.

Further, there is also no necessity to newly design the front-end device of a set-top box without a built-in cable modem, and thus the front-end device of a set-top box without a built-in cable modem can be easily configured.

Since the front-end device of a set-top box for two-way communication of this invention can reduce the number of parts and easily realize common use for a set-top box without a built-in cable modem, it is useful as a front-end device of a set-top box for two-way communication that includes a built-in cable modem for a cable television network.

What is claimed is:

1. A front-end device of a set-top box for two-way communication, the front-end device comprising:
a cable interface module which comprises:
a first connector part for connection to a cable television network;
a second connector part connected to a communication signal modulating part;
a third connector part; and
a diplexer, which is connected to the first connector part, the second connector part and the third connector part, and is operable to: (a) receive a first signal that is input from the first connector part, (b) output the received first signal to the third connector part, and (c) output, to the first connector part, the second signal that is received by the diplexer from the communication signal modulating part through the second connector part and has a second frequency lower than a first frequency of the first signal;
a video tuner module which comprises:
a fourth connector part, which has a shape that can connect to the cable television network when the cable interface module is removed from the front-end device, and is connected to the third connector part when the cable interface module is included in the front-end device;
a fifth connector part;
a video tuner, which selects a channel from an input signal; and
a first distributor, which is connected to the fourth connector part, the fifth connector part and the video tuner, and branches the first signal that is input from the fourth connector part to the fifth connector part and to the video tuner; and
a communication tuner, which is connected to the fifth connector part and selects another channel from the signal output from the fifth connector part,
wherein a connection of the fifth connector part to the communication tuner is exclusive of the cable interface module.

2. The front-end device of a set-top box for two-way communication according to claim 1,
wherein the cable interface module has a second distributor, which is provided between the diplexer and the third connector part and branches the first signal to output from the third connector part, and a sixth connector part, which is connected to an audio-visual device for a subscriber and outputs another signal that is branched by the second distributor, and
the video tuner module has a seventh connector part, which is connected to the first distributor and has a shape that can connect to the audio-visual device for the subscriber.

3. The front-end device of a set-top box for two-way communication according to claim 2, having an amplifier disposed either between the second distributor and the third connector part or between the fourth connector part and the first distributor.

4. The front-end device of a set-top box for two-way communication according to claim 1,
wherein the cable interface module, the video tuner module and the communication tuner are disposed on a main substrate, and
the communication tuner is connected to the fifth connector part through a wiring pattern inside the main substrate.

5. The front-end device of a set-top box for two-way communication according to claim 4, wherein a circuit of the communication tuner is configured inside the main substrate.

6. The front-end device of a set-top box for two-way communication according to claim 1,
wherein the communication tuner includes:
a first variable amplifier, which amplifies a signal that is output from the fifth connector part;
a frequency converter, which selects the other channel from the signal amplified by the first variable amplifier;
a second variable amplifier, which amplifies the other channel of the signal that is selected by the frequency converter;
a first filter, which smoothes a signal for controlling a gain of the first variable amplifier and inputs the signal into the first variable amplifier; and a second filter, which smoothes a signal for controlling a gain of the second variable amplifier and inputs the signal into the second variable amplifier, and wherein a time constant of the first filter is greater than or equal to a time constant of the second filter.

7. The front-end device of a set-top box for two-way communication according to claim 4, wherein a circuit of the communication tuner is configured on a substrate, which is other than the main substrate.

8. The front-end device of a set-top box for two-way communication according to claim 2, wherein the first connector part and the sixth connector part are external terminals of the set-top box.

9. The front-end device of a set-top box for two-way communication according to claim 1, wherein one of the third connector part and the fourth connector part is a male connector and the other one of the third connector part and the fourth connector part is a female connector, the male and female connectors being directly connected without the use of an indirect connection that uses a cable.

10. A front-end device of a set top box, the front-end device being configurable with and without each of a cable interface module and a communication tuner, the front-end device comprising:

a cable interface module including:
a first connector part;
a second connector part;
a third connector part;
a sixth connector part; and
a diplexer, which is connected to the first connector part, the second connector part and the third connector part, and is operable to: (a) receive a first signal that is input from the first connector part, (b) output the received first signal to the third connector part, and (c) output, to the first connector part, a second signal that is input from the second connector part and that has a frequency lower than the first signal;

a video tuner module including:
a video tuner operable to select a channel from an input signal;
a fourth connector part, which has a shape that can connect to a cable television network and is connected to the third connector part;
a fifth connector part;
a seventh connector part; and
a first distributor, which is connected to the fourth connector part, the fifth connector part, the seventh connector part and the video tuner, is operable to branch the first signal that is input from the fourth connector part to the fifth connector part and to the seventh connector part, and is operable to input another branched signal into the video tuner; and a communication tuner operable to select another channel from an input signal, wherein for configuration of the front-end device with each of the cable interface module and the communication tuner, the first connector part, the sixth connector part and the third connector part of the cable interface module are connected to the cable television network, an audio-visual device for a subscriber and the fourth connector part, respectively, and the fifth connector part is connected to the communication tuner to provide the input signal, and wherein for configuration of the front-end device without each of the cable interface module and the communication tuner, the fourth connector part and the seventh connector part of the video tuner module are connected to the cable television network and the audio-visual device for the subscriber, respectively, a connection of the video tuner module being free of connection to the cable interface module and the communication tuner.

11. The front-end device of a set-top box according to claim 10, wherein the sixth connection part and seventh connection part have a same shape for connection to the audio-visual device of the subscriber.

12. The front-end device of a set-top box according to claim 10, wherein for configuration of the front-end device with each of the cable interface module and the communication tuner, one of the third connector part and the fourth connector part is a male connector and the other one of the third connector part and the fourth connector part is a female connector, the male and female connectors being directly connected without use of an indirect connection that uses a cable.

13. The front-end device of a set-top box according to claim 10, wherein the front-end device is configured with each of the cable interface module and the communication tuner when the set-top box includes a cable modem and is configured without each of the cable interface module and the communication tuner when the set-top box does not include a cable modem.

14. A front-end device of a set top box, the front-end device being configurable with and without each of a cable interface module and a communication tuner, the front-end device comprising:

a cable interface module, which is operable to provide an interface between a cable television network and a video tuner module, and includes a first connector part, a second connector part, a third connector part, and a sixth connector part;

the video tuner module, which includes a video tuner operable to select a channel from an input signal, a fourth connector part, which has a shape that can connect to the cable television network and is connected to the third connector part, a fifth connector part, a seventh connector part, and a first distributor, which is connected to the fourth connector part, the fifth connector part, the seventh connector part and the video tuner, is operable to branch the first signal that is input from the fourth connector part to the fifth connector part and to the seventh connector part, and is operable to input another branched signal into the video tuner; and a communication tuner operable to select another channel from an input signal, wherein for configuration of the front-end device with each of the cable interface module and the communication tuner, the first connector part, the sixth connector part and the third connector part of the cable interface module are connected to a cable television network, an audio-visual device for a subscriber and the fourth connector part, respectively, and the fifth connector part is connected to the communication tuner to provide the input signal, and wherein for configuration of the front-end device without each of the cable interface module and the communication tuner, the fourth connector part and the seventh connector part of the video tuner module are connected to the cable television network and the audio-visual device for the subscriber, respectively, a connection of the video tuner module being free of connection to the cable interface module and the communication tuner.

15. The front-end device of a set-top box according to claim 14, wherein the sixth connection part and seventh connection part have a same shape for connection to the audio-visual device of the subscriber.

16. The front-end device of a set-top box according to claim 14, wherein for configuration of the front-end device with each of the cable interface module and the communication tuner, one of the third connector part and the fourth connector part is a male connector and the other one of the third connector part and the fourth connector part is a female connector, the male and female connectors being directly connected without use of an indirect connection that uses a cable.

17. A method of configuring a front-end device of a set-top box for two-way communication without a built-in cable modem, from a front-end device of a set-top box for two-way communication, wherein the front-end device comprises:
a cable interface module including:
a first connector part;
a second connector part;
a third connector part;
a sixth connector part;
a diplexer, which is connected to the first connector part, the second connector part and the third connector part, and is operable to: (a) receive a first signal that is input from the first connector part, (b) output the received first signal to the third connector part, and (c) output, to the first connector part, a second signal that is input from the second connector part and has a frequency lower than the first signal; and
a second distributor, which is provided between the diplexer and the third connector part and branches the first signal to output from the third connector part, the sixth connector part being connected to an audio-visual device for a subscriber to output another signal that is branched by the second distributor;

a video tuner module including:
a video tuner operable to select a channel from an input signal;
a fourth connector part, which has a shape that can connect to a cable television network and is connected to the third connector part;
a fifth connector part;
a seventh connector part;
a first distributor, which is connected to the fourth connector part, the fifth connector part, the seventh connector part and the video tuner, is operable to branch the first signal that is input from the fourth connector part to the fifth connector part and to the seventh connector part, and is operable to input another branched signal into the video tuner; and
an amplifier disposed between the fourth connector part and the first distributor; and
a communication tuner operable to select another channel from an input signal,
wherein, in the front-end device, the diplexer and the second distributor are inserted into one unit, the amplifier, the first distributor and the video tuner are inserted into one unit, with the cable interface module and the video tuner module being disposed on a main substrate, a circuit of the communication tuner is configured on the main substrate free of coaxial cable connections, wiring patterns are disposed on the main substrate for electrically coupling the communication tuner and the video tuner module,
wherein the method comprises:
a removing step of removing the cable interface module and the communication tuner; and
a connecting step of connecting the video tuner module to the cable television network and an audio-visual device in a subscriber's home, a connection of the video tuner module being free of connection to the cable interface module and the communication tuner.

* * * * *